(12) United States Patent
Wetter et al.

(10) Patent No.: US 9,315,222 B1
(45) Date of Patent: Apr. 19, 2016

(54) ADJUSTMENT MEANS FOR A SUSPENSION HANGER ASSEMBLY

(71) Applicants: Michael S. Wetter, Orange City, IA (US); Joel D. Van Den Brink, Rock Valley, IA (US)

(72) Inventors: Michael S. Wetter, Orange City, IA (US); Joel D. Van Den Brink, Rock Valley, IA (US)

(73) Assignee: LINK MFG., LTD., Sioux Center, IA (US)

( * ) Notice: Subject to any disclaimer, the term of this patent is extended or adjusted under 35 U.S.C. 154(b) by 0 days.

(21) Appl. No.: 14/798,690

(22) Filed: Jul. 14, 2015

(51) Int. Cl.
*B62D 33/10* (2006.01)
*B60G 7/00* (2006.01)
*B60G 9/02* (2006.01)
*B60G 7/02* (2006.01)
*B60G 9/00* (2006.01)

(52) U.S. Cl.
CPC ............. *B62D 33/10* (2013.01); *B60G 7/001* (2013.01); *B60G 7/02* (2013.01); *B60G 9/003* (2013.01); *B60G 9/02* (2013.01); *B60G 2200/32* (2013.01); *B60G 2204/4302* (2013.01); *B60G 2206/601* (2013.01)

(58) Field of Classification Search
CPC ................................................ B60G 2206/601
See application file for complete search history.

(56) References Cited

U.S. PATENT DOCUMENTS

| | | | | |
|---|---|---|---|---|
| 4,267,896 A * | 5/1981 | Hendriksen | ............ | B60G 9/003 267/66 |
| 4,736,964 A * | 4/1988 | Specktor | .................. | B60G 7/02 280/86.75 |
| 4,869,527 A * | 9/1989 | Coddens | .................. | B60G 7/02 280/86.753 |
| 5,163,699 A * | 11/1992 | Specktor | .............. | B60G 13/006 280/86.753 |
| 5,301,977 A * | 4/1994 | Schlosser | ............... | B62D 17/00 280/86.75 |
| 5,398,411 A * | 3/1995 | Kusaka | ................... | B23P 13/04 280/124.134 |
| 6,367,826 B1 * | 4/2002 | Klais | ........................ | B60G 7/02 280/86.751 |
| 6,659,479 B1 * | 12/2003 | Raidel, II | ................. | B60G 7/02 280/124.16 |
| 6,851,687 B2 * | 2/2005 | Klais | .................... | B60G 11/181 280/86.754 |
| 7,083,176 B2 * | 8/2006 | Soles | ........................ | B60G 7/02 280/86.751 |
| 7,296,809 B2 * | 11/2007 | Zebolsky | ............... | B60G 7/006 280/124.116 |
| 7,331,588 B2 * | 2/2008 | Johnson | ................... | B60G 9/00 280/124.116 |
| 7,661,916 B2 * | 2/2010 | Downey | ................ | F16B 5/0225 411/169 |
| 7,891,679 B2 | 2/2011 | Svartz et al. | | |
| 8,590,912 B2 * | 11/2013 | McCarthy | .............. | B60G 11/10 280/124.163 |
| 8,622,406 B2 * | 1/2014 | Eveley | ..................... | B60G 7/02 280/124.116 |
| 8,979,105 B2 * | 3/2015 | McCarthy | .............. | B62D 17/00 280/124.163 |
| 9,233,589 B1 * | 1/2016 | Miller | ...................... | B60G 7/02 |
| 2005/0001397 A1 * | 1/2005 | Genick, II | ............... | B60G 7/02 280/86.754 |
| 2005/0156398 A1 * | 7/2005 | Ramsey | ................... | B60G 7/02 280/124.116 |

* cited by examiner

*Primary Examiner* — Nicole Verley
(74) *Attorney, Agent, or Firm* — Dennis L. Thomte; Thomte Patent Law Office LLC

(57) ABSTRACT

An adjustment mechanism for adjustably aligning the bushing pin of a hanger bracket to which a lift arm of a lift axle suspension system is secured. The adjustment mechanism may also be used for adjustably aligning the bushing pin of an auxiliary axle which is of the non-lift type. The adjustment mechanism may also be used for adjustably aligning the bushing pin of a primary axle. More particularly, the invention relates to an adjustable alignment mechanism of the type described which includes an improved pointer device which visually indicates the alignment position of the bushing pin. Even more particularly, this invention relates to an improved means for securing the bushing pin in its aligned position.

14 Claims, 8 Drawing Sheets

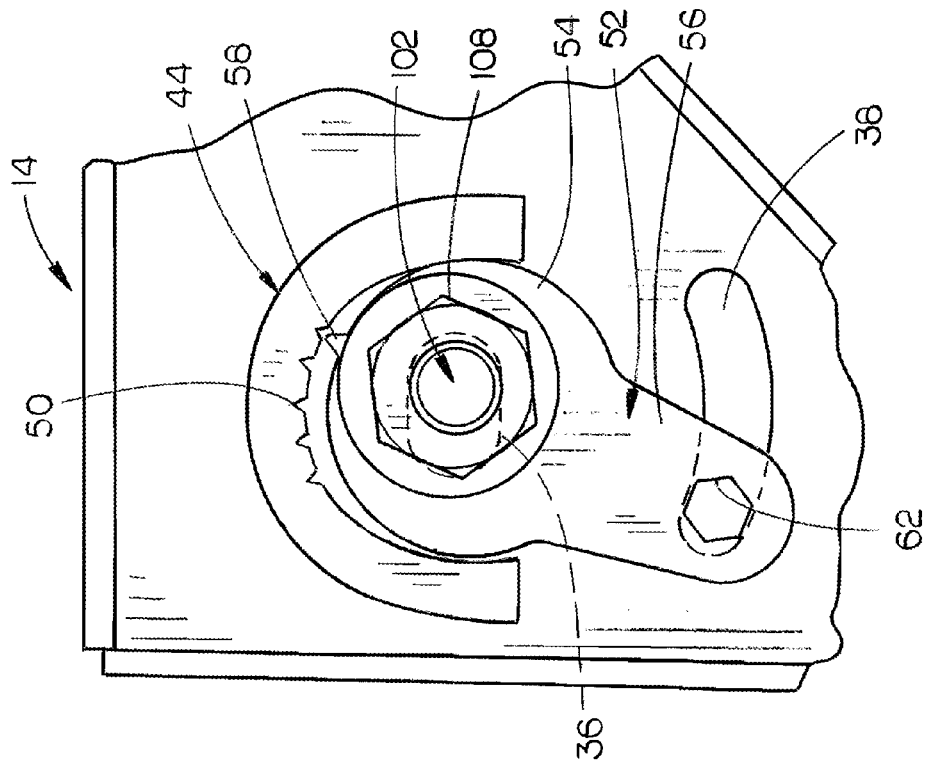
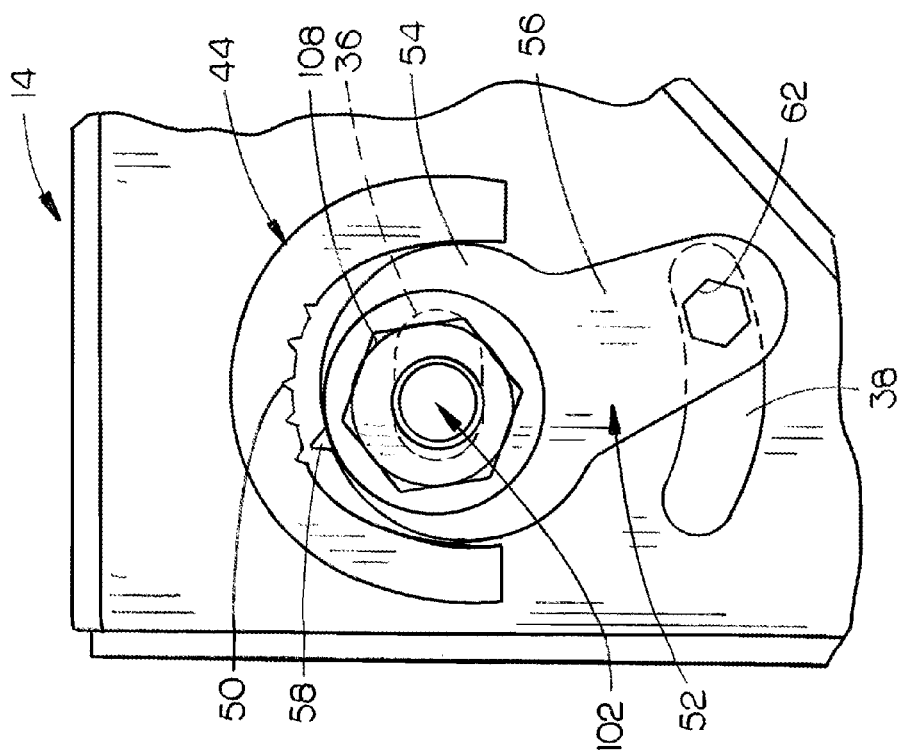

ADJUSTMENT MEANS FOR A SUSPENSION HANGER ASSEMBLY

BACKGROUND OF THE INVENTION

1. Field of the Invention

This invention relates to an adjustment means for adjustably aligning the bushing pin of a suspension hanger assembly. The invention may be used with an auxiliary axle of the non-lift type, a lift axle or a primary axle. More particularly, the invention relates to an adjustment means of the type described which includes an improved pointer device which visually indicates the alignment position of the bushing pin. Even more particularly, this invention relates to an improved means for securing the bushing pin in its aligned position.

2. Description of the Related Art

In most of the prior art lift axle assemblies, a pair of hanger brackets are secured to the elongated frame members of the vehicle. Each of the hanger brackets have a trailing lift arm pivotally secured thereto which extends rearwardly therefrom with the lift axle thereof being movable between raised and lowered positions. If the lift arms are not properly aligned with the frame members of the vehicle, the wheels of the lift axle will not be perfectly aligned with the wheels of the tandem axles. The same is also true with auxiliary axles of the non-lift type or other axles on the vehicle such as primary axles.

In U.S. Pat. No. 7,891,679 B2, an adjustment arrangement for a suspension hanger assembly is disclosed. Although the assembly of the '679 patent has apparently met with some success, the adjustment arrangement therein suffers from a pair of disadvantages. The first disadvantage of the suspension arrangement of the '679 patent is that the indicia system thereof is not readily visible and may be covered with road debris. Further, the indicia system of the '679 patent may wear off and not be visible at all. A second disadvantage of the adjustment arrangement of the '679 patent is that the bushing pin must have a wrench mounted on the head portion thereof and a wrench mounted on the nut portion thereof to facilitate tightening of the bushing pin in the hanger member. Even though the '679 patent has the above identified disadvantages, the disclosure of the '679 patent is relied upon and incorporated herein by reference thereto to complete this disclosure if necessary.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An improved lift axle suspension mounting system is disclosed in the co-pending application Ser. No. 14/751,647 filed Jun. 26, 2015 which is incorporated herein by reference thereto to complete this disclosure if necessary. The instant invention relates to an adjustment mechanism or system for properly aligning the hanger bushing pin of the hanger bracket. The adjustable alignment mechanism or system of the present invention also includes a more convenient method of tightening the hanger bushing pin of the hanger bracket.

More particularly, each of the hanger brackets of a lift axle, an auxiliary axle of the non-lift type or a primary axle includes inner and outer vertically disposed side walls. The inner side wall of the hanger bracket has a horizontally disposed first slot formed therein at the upper end thereof. The inner side wall of the hanger bracket also has an upwardly curved arcuate second slot formed therein below the first slot thereof. The outer side wall of the hanger bracket has a horizontally disposed first slot formed therein at the upper end thereof which registers with the first slot in the inner side wall of the hanger bracket. The outer side wall of the hanger bracket has an upwardly curved arcuate second slot formed therein below the first slot thereof which registers with the second slot in the inner side wall of the hanger bracket.

An inverted flat and generally U-shaped first ring member is secured to the outer side of the inner side wall of the hanger bracket so as to partially extend around the first slot in the inner side wall of the hanger bracket. The first ring member has inner and outer edges with the inner edge of the first ring member having a plurality of radially-spaced index notches formed therein. A first flat actuator plate having an upper end and a lower end has its upper end movably positioned within the inner edge of the first ring member. The upper end of the first actuator plate has a pointer extending upwardly therefrom which is movably positioned adjacent the index notches of the first ring member. The first actuator plate has a bolt opening formed therein at its upper end. The first actuator plate has an adjustment opening formed therein at the lower end thereof which is positioned outwardly of the second slot in the inner side wall of the hanger bracket.

A flat first plate is positioned outwardly of the upper end of the first actuator plate and is secured to the first ring member and/or the inner side wall of the hanger bracket. The flat first plate has an elongated bolt head receiving opening formed therein which is configured to receive and capture the head of a bolt therein.

An inverted flat and generally U-shaped second ring member is secured to the outer side of the outer side wall of the hanger bracket so as to partially extend around the first slot in the outer side wall of the hanger bracket. The second ring member has inner and outer edges with the inner edge of the second ring member having a plurality of radially-spaced index notches formed therein. A flat second actuator plate having an upper end and a lower end has its upper end movably positioned within the inner edge of the second ring member. The upper end of the second actuator plate has a pointer extending upwardly therefrom which is movably positioned adjacent the index notches of the second ring member. The second actuator plate has a bolt opening formed therein at its upper end and has an adjustment opening formed therein at the lower end thereof. A flat washer, having a central opening, is positioned at the outer side of the second actuator plate. An elongated bolt or bushing pin having a head portion and a threaded shank portion has its shank portion extending through the bolt head receiving opening in the flat first plate, through the bolt opening in the first actuator plate, through the first slot in the inner side wall of the hanger bracket, through the first slot in the outer side wall of the hanger bracket, through the bolt opening in the second actuator plate, and through the washer. A nut is secured to the bolt outwardly of the washer. The nut is able to be tightened on the bolt without the need for a wrench to be placed on the head of the bolt since the head of the bolt is held captive in the bolt head receiving opening formed in the first plate. The bolt or bushing pin is configured to have a bushing of a lift arm rotatably mounted thereon between the inner and outer side walls of the hanger bracket.

An adjustment tool is adapted to extend through the adjustment opening in the first actuator plate, through the second slot in the inner side wall of the hanger bracket, through the second slot in the outer side wall of the hanger bracket, and through the adjustment opening in the second actuator plate.

The movement of the lower ends of the actuator plate by the tool causes the bolt to adjustably move within the first slots of the inner side wall and the outer side wall of the hanger bracket. The adjustment plates are selectively moved by the tool so that the lift arm is aligned with the associated frame member. If desired, the actuator plates may be individually moved by separate tools.

Although the adjustment means of this invention is well suited for use with a lift axle, the adjustment means of this invention is also well suited for auxiliary axles which are not of the lift type, and primary axles.

It is therefore a principal object of the invention to provide an improved adjustable alignment means for a suspension hanger assembly.

A further object of the invention is to provide an adjustable alignment means for a suspension hanger assembly which includes an improved adjustment index system which is readily visible.

A further object of the invention is to provide an adjustable alignment means for a suspension hanger assembly wherein the bolt or bushing pin of the suspension system has the head portion thereof captive so that the nut on the bolt may be tightened without the need for a wrench to be placed on the bolt head.

A further object of the invention is to provide an adjustable alignment means for a suspension hanger assembly which is convenient to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 is a partial side elevation view illustrating the adjustable alignment mechanism in a first position;

FIG. 8 is a partial side elevational view illustrating the adjustable alignment mechanism in a second position.

DESCRIPTION OF THE PREFERRED EMBODIMENT

Figure 1:
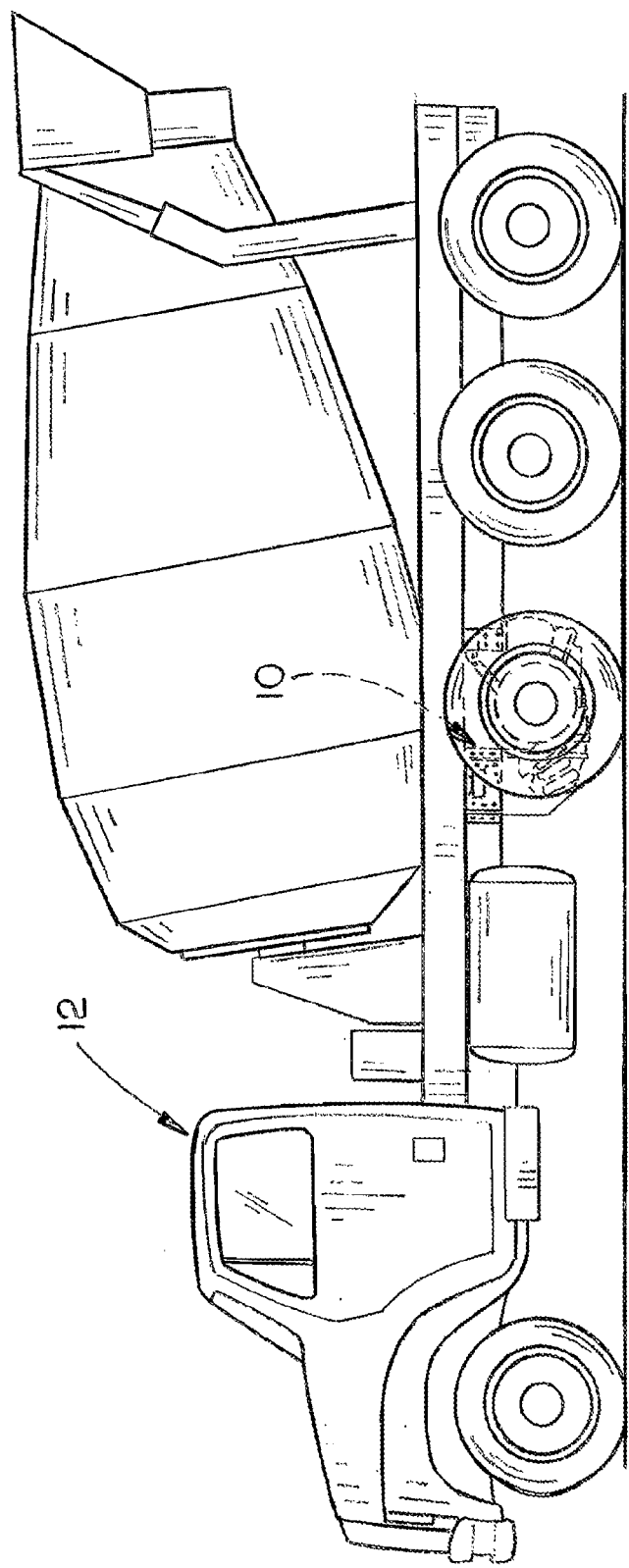
FIG. 1 is a side view of a vehicle having a lift axle suspension system mounted thereon.
Figure 2:
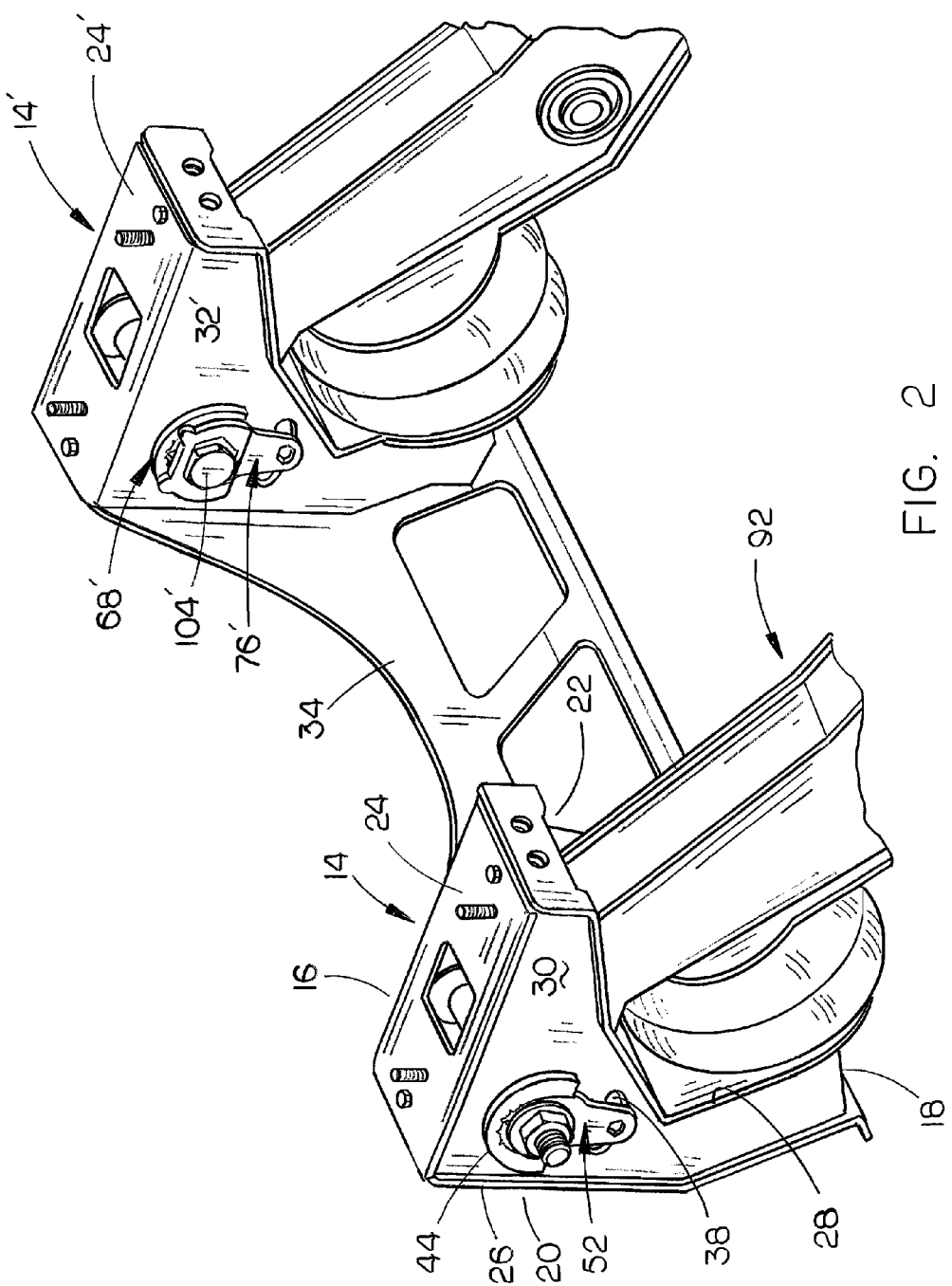
FIG. 2 is a partial perspective view illustrating a lift axle suspension system having the adjustable alignment system of the instant invention associated therewith.
Figure 3:
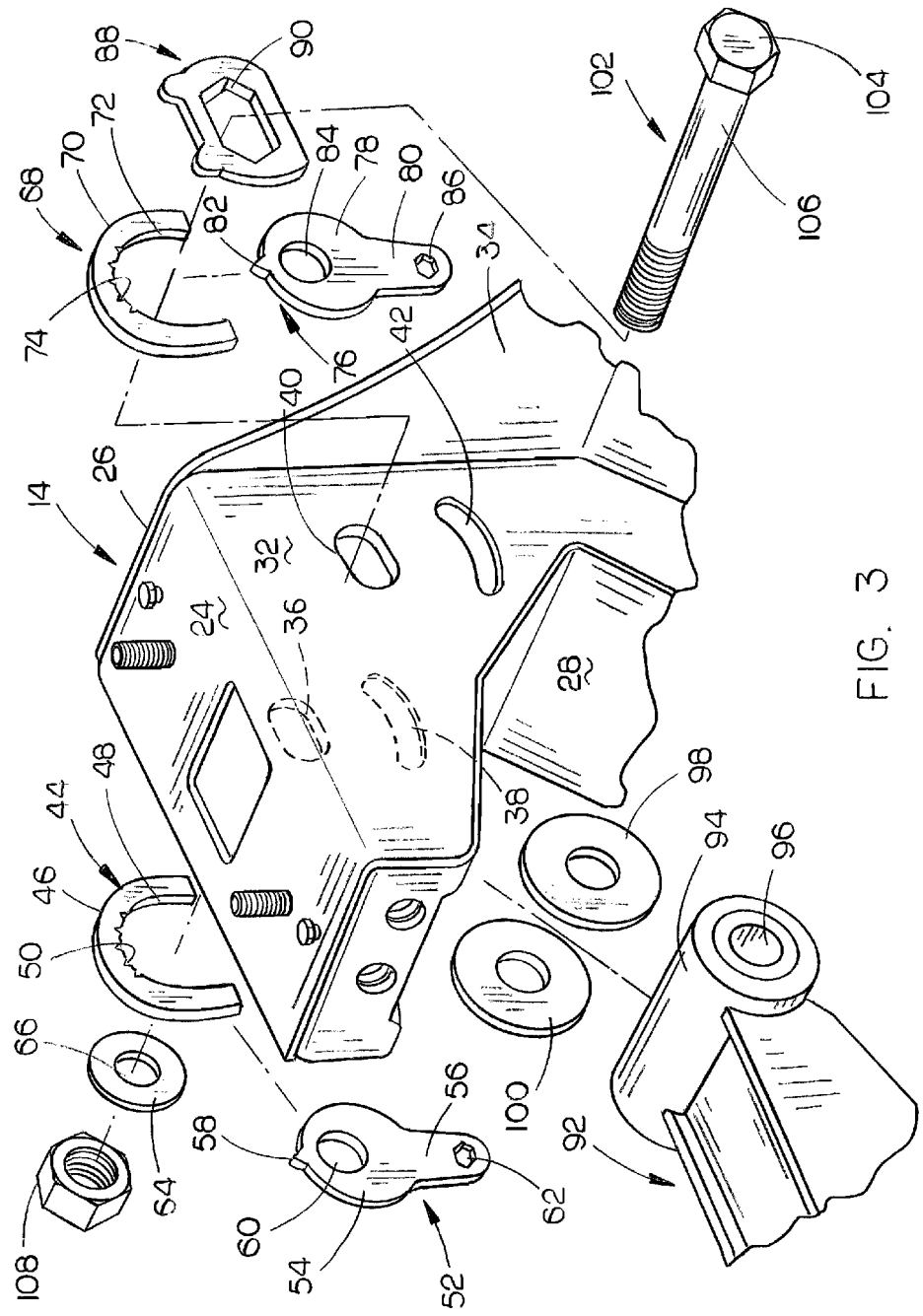
FIG. 3 is a partial exploded perspective view of one of the hanger brackets of a lift axle suspension system having the adjustable alignment system of the instant invention associated therewith.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a lift axle suspension system such as disclosed in the co-pending patent application entitled AN AXLE SUSPENSION MOUNTING SYSTEM, Ser. No. 14/751,647 filed Jun. 26, 2015, the disclosure of which is relied upon to complete this disclosure if necessary.

The system 10 of this invention may be used with a lift axle suspension system of the "tag" type or a lift axle suspension system of the "pusher" type. If the lift axle suspension system is of the "pusher" type, the system 10 will be secured to the longitudinally extending frame members of the vehicle between the cab of the vehicle and the tandem axles of the vehicle. If the lift axle suspension system is of the "tag" type, the system 10 will be secured to the frame members of the vehicle rearwardly of the tandem axles. In the description of the preferred embodiment, the system 10 will be described as being of the pusher type with it being understood that the system 10 could be used with the tag type lift axle suspension system. The system 10 may also be used with auxiliary axles of the non-lift type and primary axles.

The system 10 is mounted to a vehicle 12 including first and second longitudinally extending frame members having forward and rearward ends. As used herein, the term vehicle includes trucks with primary and auxiliary suspensions and trailers with primary and auxiliary suspensions.

Frame brackets such as shown in the co-pending application are bolted to the frame members of the vehicle. Hanger brackets 14 and 14' are bolted to the frame brackets. Inasmuch as hanger bracket 14' is a mirror image of hanger bracket 14, only hanger bracket 14 will be described in detail with " ' " indicating identical structure on hanger bracket 14'.

For purposes of description, hanger bracket 14 will be described as having an upper end 16, a lower end 18, a forward end 20, and a rearward end 22. Hanger bracket 14 includes a top wall 24, a front wall 26, a rear wall 28, an outer side wall 30 and an inner side wall 32. Front wall 26 is part of a structure 34 which interconnects hanger brackets 14 and 14'.

Outer side wall 30 has a horizontally disposed and elongated slot-like bolt opening 36 formed therein below the upper end thereof. Outer side wall 30 has a generally arcuate slot 38 formed therein below bolt opening 36. Inner side wall 32 of hanger bracket 14 has a horizontally disposed and elongated slot-like bolt opening 40 formed therein below the upper end thereof which registers with bolt opening 36 in outer side wall 30 of hanger bracket 14. Inner side wall 32 of hanger bracket 14 has a generally arcuate slot 42 formed therein below bolt opening 40 which registers with slot 38 in outer side wall 30 of hanger bracket 14.

The numeral 44 refers to an inverted generally U-shaped ring member which is secured to the exterior of outer side wall 30 by welding or the like which partially extends around bolt opening 36 as seen in the drawings. Ring member 44 includes an outer surface or edge 46 and an inner surface or edge 48. Inner surface 48 of ring member 44 has a plurality of radially spaced-apart indicator notches 50 formed therein.

Figure 4:
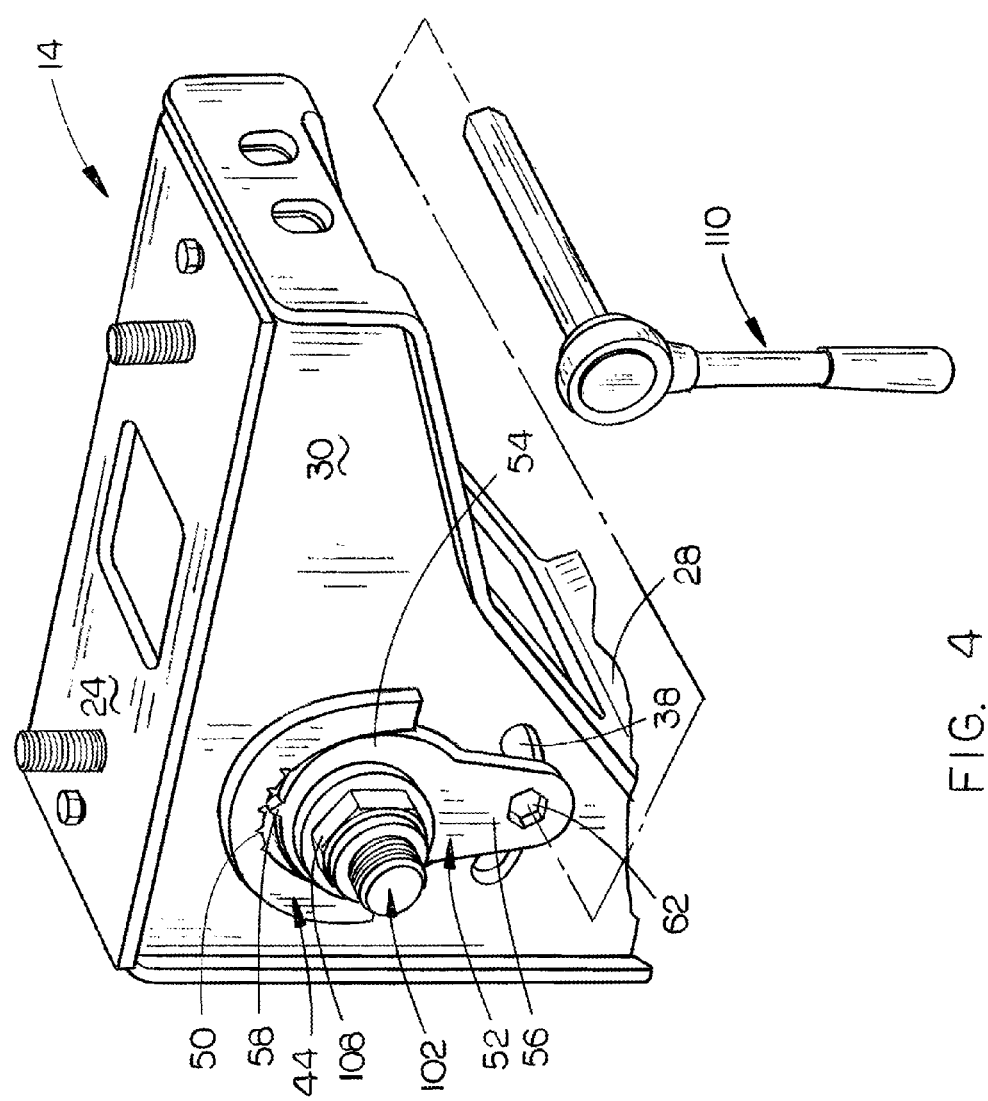
FIG. 4 is a partial perspective view of one of the hanger brackets of a lift axle suspension system having the adjustable alignment system of the instant invention associated therewith.
Figure 5:
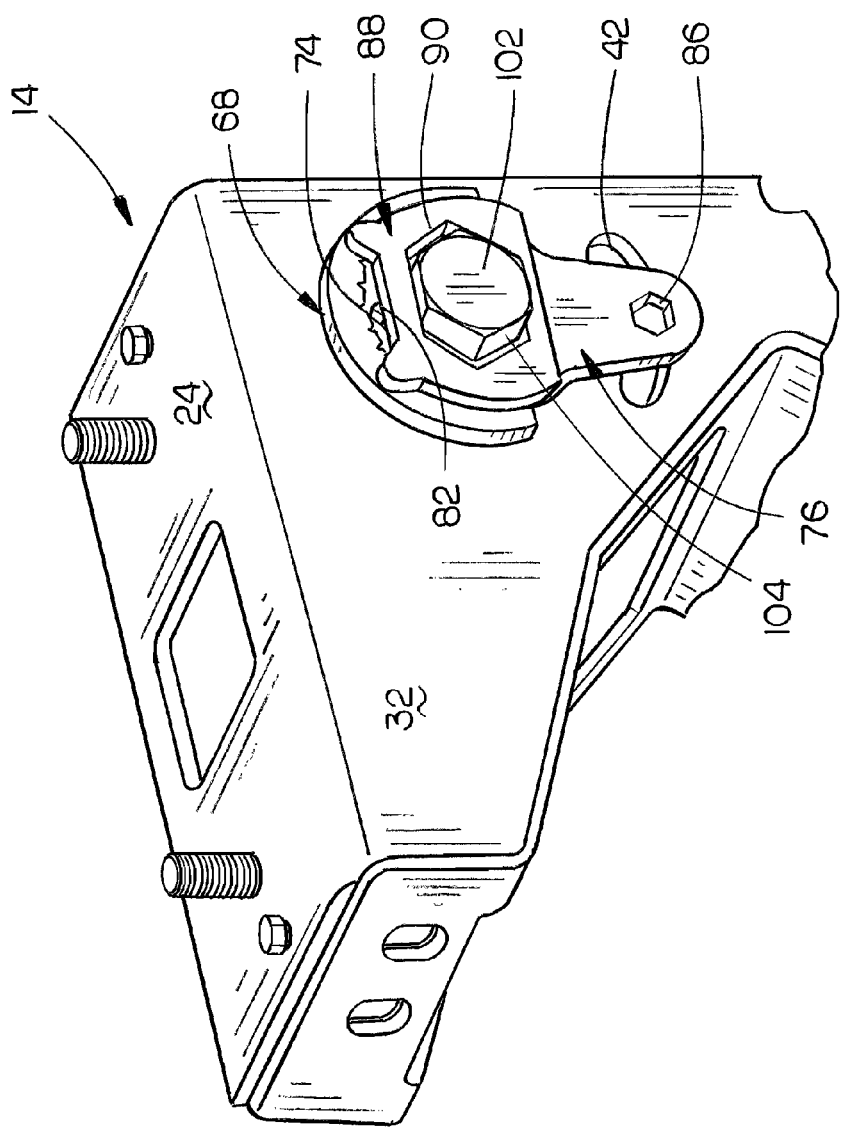
FIG. 5 is a partial perspective view of the inner side of the hanger bracket of FIG. 4 which has the adjustable alignment system of the instant invention associated therewith.
Figure 6:
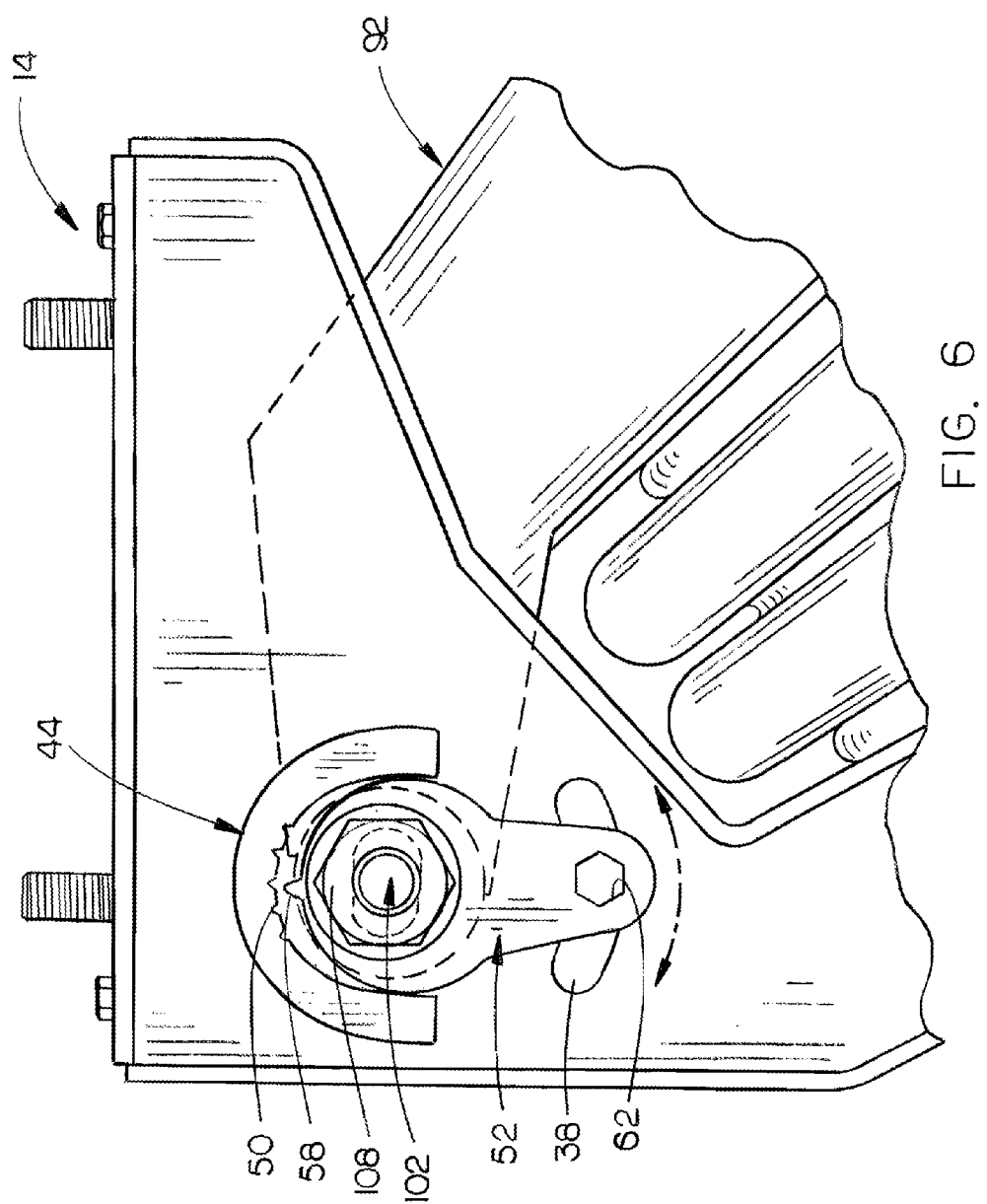
FIG. 6 is a partial side elevational view as seen from the outer side of the hanger bracket of FIG. 4.
Figure 9:
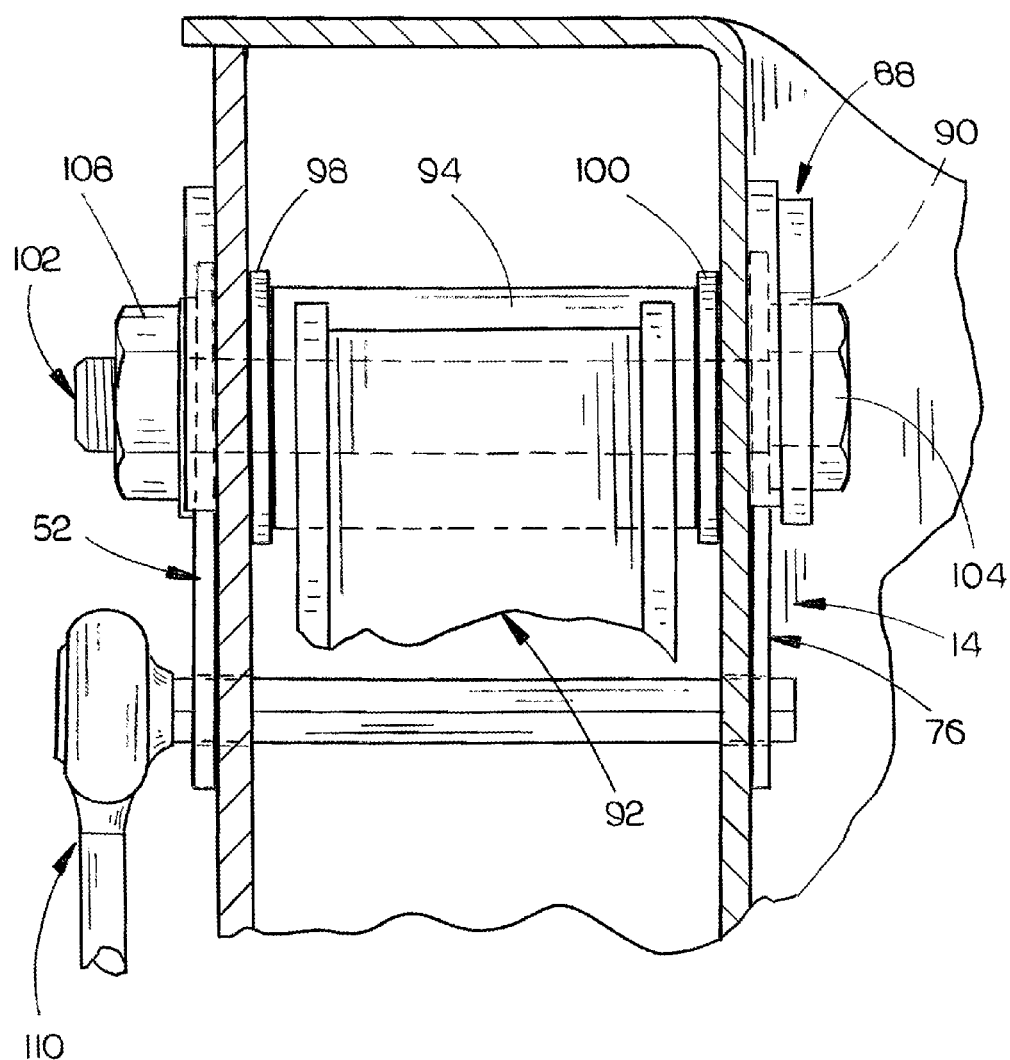
FIG. 9 is a partial sectional view illustrating the adjustable alignment system of this invention attached to the upper end of a lift arm of a lift axle suspension system.

The numeral 52 refers to a flat actuator plate having a generally circular upper end portion 54 and a leg portion 56 which extends downwardly from upper end portion 54. The upper end of upper end portion 56 has a pointer 58 extending upwardly therefrom. The upper end portion 54 of actuator plate 52 has a bolt opening 60 formed therein, the center of which is offset from the center axis of upper end portion 54. Upper end portion 54 of actuator plate 52 is rotatably positioned within ring member 44. Leg portion 56 of actuator plate 52 has a tool opening 62 formed therein which registers with slot 32 as seen in FIG. 4. Tool opening 62 may have a hexagonal shape, a square shape or a shape other than circular. Washer 64 is positioned at the outer side of upper end portion 54 of actuator plate 52 so that the opening 66 of washer 64 registers with opening 60 of actuator plate 52.

The numeral 68 refers to an inverted generally U-shaped ring member which is secured to the exterior surface of inner side wall 32 by welding or the like which partially extends around bolt opening 40 as seen in the drawings. Ring member 68 includes an outer surface or edge 70 and an inner surface or edge 72. Inner surface 72 of ring member 68 has a plurality of spaced-apart indicator notches 74 formed therein. Ring member 68 is identical to ring member 44.

The numeral 76 refers to a flat actuator plate having a generally circular upper end portion 78 and a leg portion 80 which extends downwardly from upper end portion 78. The upper end of upper end portion 78 has a pointer 82 extending upwardly therefrom. Upper end portion 78 has a bolt opening 84 formed therein, the center of which is offset from the center axis of upper end portion 78. Upper end portion 78 of actuator plate 76 is rotatably positioned within ring member 68. A leg portion 80 of actuator plate 76 has a tool opening 86 formed therein which registers with slot 42 as seen in the drawings. Tool opening 86 may have a hexagonal shape, a square shape, or other shape other than circular.

The numeral 88 refers to a bolt head capture plate which is positioned at the outer side of upper end portion 78 of actuator plate 76. Plate 88 has an elongated and horizontally disposed bolt head receiving opening 90 which has a generally hexagonal form or a form to match the bolt head which is received therein.

The numeral 92 refers to a lift arm which is part of the lift axle suspension system or an auxiliary axle system of the non-lift type and which has a bushing 94 secured thereto. Bushing 94 has a central bolt opening 96 extending therethrough. The bushing 94 could be a part of a primary axle as well. Bushing 94 is received between the outer side wall 30 and inner side wall 32 so that bolt opening 96 registers with bolt opening 36 in outer side wall 30 and registers with bolt opening 40 in inner side wall 32. Washers 98 and 100 are positioned at the ends of bushing 94.

The numeral 102 refers to a bolt or bushing pin having a head portion 104 and a threaded shank. Bolt 102 extends through opening 90 in plate 88, through opening 84 in actuator plate 76, through bolt opening 40 in inner side wall 32, through washer 98, through opening 96 in bushing 94, through washer 100, through bolt opening 36 in outer side wall 30, through bolt opening 60 in actuator plate 52 and through washer 64. Nut 108 is threadably secured to the outer end of bolt 102.

The adjustment means of this invention is used to adjust the position of the bushing pin or bolt 102. The nut 108 is first loosened somewhat. The shank of the tool 110 is inserted through tool opening 62 in actuator plate 52, through slot 38 in outer side wall 30 of hanger bracket 14, through slot 42 in inner side wall 32 of hanger bracket 14 and through tool opening 86 in actuator plate 76. The tool 110 is then moved to pivot or rotate the actuator plates 52 and 76 within ring members 44 and 68 respectively. The rotation of actuator plates 52 and 76 causes the shank 106 of bolt 102 to move within slots 36 and 40. The actuator plates 52 and 76 are rotated until they are properly aligned as indicated by the pointers 58 and 82 with respect to the notches 50 and 74 of ring members 44 and 68 respectively.

The nut 108 is then tightened to maintain the bolt 102 in position. The nut 108 may be tightened without a wrench being secured to the head 104 since head 104 is held captive in opening 90 of plate 88.

If desired, separate tools may be inserted into the openings 62 and 86. Further, a single tool may be used to first adjust one of the actuator plates and then used to then adjust the other actuator plate.

Although the adjustment means of this invention is well suited for use with a lift axle, the adjustment means of this invention is also well suited for auxiliary axles which are not of the lift type, and is well suited for primary axles.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
   a load-bearing vehicle including first and second horizontally spaced-apart and longitudinally extending frame members having rearward and forward ends, and upper and lower ends;
   a first hanger bracket operatively secured to said first frame member;
   a second hanger bracket operatively secured to said second frame member;
   each of said first and second hanger brackets comprising:
   (a) a vertically disposed outer side wall having an upper end, a lower end, a forward end, a rearward end, an inner side and an outer side;
   (b) a vertically disposed inner side wall which is horizontally spaced from said outer side wall and having an upper end, a lower end, a forward end, a rearward end, an inner side and an outer side;
   (c) a first end wall which is secured to said forward ends of said inner and outer side walls and which extends therebetween with said forward end wall having an upper end and a lower end;
   (d) a second end wall which is secured to said rearward ends of said inner and outer side walls and which extends therebetween with said second rearward wall having an upper end and a lower end;
   (e) a horizontally disposed top wall extending between said upper ends of said inner and outer side walls and which has a first end, a second end, an inner end, an outer end, a top side and a bottom side;
   said outer side wall having a horizontally disposed first slot, having first and second ends, formed therein below said upper end of said outer side wall;
   said outer side wall having a generally arcuate second slot, with first and second ends, formed therein below said first slot thereof;
   said inner side wall having a horizontally disposed first slot, having first and second ends, formed therein below said upper end of said inner side wall which is horizontally aligned with said first slot in said outer side wall thereof;

said inner side wall having a generally arcuate second slot, having first and second ends formed therein below said first slot thereof which is horizontally aligned with said second slot in said outer side wall thereof;
an inverted flat U-shaped first ring member secured to said outer side of said inner side wall so as to partially extend around said first slot in said inner side wall;
said first ring member having inner and outer edges;
said inner edge of said first ring member having a plurality of radially-spaced index notches formed therein;
a flat first actuator plate having an upper end and a lower end;
said first actuator plate having its upper end movably positioned within said inner edge of said first ring member;
said upper end of said first actuator plate having a pointer extending upwardly therefrom which is positioned adjacent said index notches of said first ring member;
said first actuator plate having a bolt opening formed therein at its said upper end;
said first actuator plate having an adjustment opening formed therein at said lower end thereof which is positioned outwardly of said second slot in said inner side wall of said first hanger bracket;
a flat first plate positioned outwardly of said upper end of said first actuator plate which is secured to said first ring member and said inner side wall of the hanger bracket;
said flat first plate having a bolt head receiving opening formed therein configured to receive the head of a bolt;
an inverted flat U-shaped second ring member secured to said outer side of said outer side wall so as to partially extend around said first slot in said outer side wall;
said second ring member having inner and outer edges;
said inner edge of said second ring member having a plurality of radially-spaced index notches formed therein;
a flat second actuator plate having an upper end and a lower end;
said second actuator plate having its upper end movably positioned within said inner edge of said second ring member;
said upper end of said second actuator plate having a pointer extending upwardly therefrom which is positioned adjacent said index notches of said second ring member;
said second actuator plate having a bolt opening formed therein at its said upper end;
said second actuator plate having an adjustment opening formed therein at said lower end thereof;
a flat washer, having a central opening, positioned at the outer side of said second actuator plate;
an elongated bolt having a head portion and a threaded shank portion;
said shank portion of said bolt extending through said bolt head receiving opening in said flat first plate, through said bolt opening in said first actuator plate, through said first ring member, through said first slot in said inner side wall, through said first slot in said outer side wall, through said second ring member and said bolt opening in said second actuator plate, and through said washer;
a nut secured to said bolt outwardly of said washer; and
said bolt being configured to have a bushing of an auxiliary axle rotatably mounted thereon between said inner and outer side walls of the hanger bracket.

2. The combination of claim 1 wherein the vehicle is a truck having a primary suspension system.

3. The combination of claim 1 wherein the vehicle is a truck having an auxiliary suspension system.

4. The combination of claim 1 wherein the vehicle is a trailer having a primary suspension system.

5. The combination of claim 1 wherein the vehicle is a trailer having an auxiliary suspension system.

6. The combination of claim 1 wherein said bolt head receiving opening in said first flat plate receives said bolt head and holds said bolt head portion against rotation.

7. In combination:
a load-bearing vehicle including first and second horizontally spaced-apart and longitudinally extending frame members having rearward and forward ends, and upper and lower ends;
a first hanger bracket operatively secured to said first frame member;
a second hanger bracket operatively secured to said second frame member;
each of said first and second hanger brackets comprising:
  (a) a vertically disposed outer side wall having an upper end, a lower end, a forward end, a rearward end, an inner side and an outer side;
  (b) a vertically disposed inner side wall which is horizontally spaced from said outer side wall and having an upper end, a lower end, a forward end, a rearward end, an inner side and an outer side;
  (c) a first end wall which is secured to said forward ends of said inner and outer side walls and which extends therebetween with said forward end wall having an upper end and a lower end;
  (d) a second end wall which is secured to said rearward ends of said inner and outer side walls and which extends therebetween with said second rearward wall having an upper end and a lower end;
  (e) a horizontally disposed top wall extending between said upper ends of said inner and outer side walls and which has a first end, a second end, an inner end, an outer end, a top side and a bottom side;
said outer side wall having a horizontally disposed first slot, having first and second ends, formed therein below said upper end of said outer side wall;
said outer side wall having a generally arcuate second slot, with first and second ends, formed therein below said first slot thereof;
said inner side wall having a horizontally disposed first slot, having first and second ends, formed therein below said upper end of said inner side wall which is horizontally aligned with said first slot in said outer side wall thereof;
said inner side wall having a generally arcuate second slot, having first and second ends formed therein below said first slot thereof which is horizontally aligned with said second slot in said outer side wall thereof;
an inverted flat U-shaped first ring member secured to said outer side of said inner side wall so as to partially extend around said first slot in said inner side wall;
said first ring member having inner and outer edges;
said inner edge of said first ring member having a plurality of radially-spaced index notches formed therein;
a flat first actuator plate having an upper end and a lower end;
said first actuator plate having its upper end movably positioned within said inner edge of said first ring member;
said upper end of said first actuator plate having a pointer extending upwardly therefrom which is positioned adjacent said index notches of said first ring member;
said first actuator plate having a bolt opening formed therein at its said upper end;

said first actuator plate having an adjustment opening formed therein at said lower end thereof which is positioned outwardly of said second slot in said inner side wall of said first hanger bracket;
a flat first plate positioned outwardly of said upper end of said first actuator plate which is secured to said first ring member and said inner side wall of the hanger bracket;
said flat first plate having a bolt head receiving opening formed therein configured to receive the head of a bolt;
an inverted flat U-shaped second ring member secured to said outer side of said outer side wall so as to partially extend around said first slot in said outer side wall;
said second ring member having inner and outer edges;
said inner edge of said second ring member having a plurality of radially-spaced index notches formed therein;
a flat second actuator plate having an upper end and a lower end;
said second actuator plate having its upper end movably positioned within said inner edge of said second ring member;
said upper end of said second actuator plate having a pointer extending upwardly therefrom which is positioned adjacent said index notches of said second ring member;
said second actuator plate having a bolt opening formed therein at its said upper end;
said second actuator plate having an adjustment opening formed therein at said lower end thereof;
a flat washer, having a central opening, positioned at the outer side of said second actuator plate;
an elongated bolt having a head portion and a threaded shank portion;
said shank portion of said bolt extending through said bolt head receiving opening in said flat first plate, through said bolt opening in said first actuator plate, through said first ring member, through said first slot in said inner side wall, through said first slot in said outer side wall, through said second ring member and said bolt opening in said second actuator plate, and through said washer;
a nut secured to said bolt outwardly of said washer; and
said bolt being configured to have a bushing of a lift axle rotatably mounted therein between said inner and outer side walls of the hanger bracket.

8. The combination of claim 7 wherein the vehicle is a truck having a primary suspension system.

9. The combination of claim 7 wherein the vehicle is a truck having an auxiliary suspension system.

10. The combination of claim 7 wherein the vehicle is a trailer having a primary suspension system.

11. The combination of claim 7 wherein the vehicle is a trailer having an auxiliary suspension system.

12. The combination of claim 7 wherein said bolt head receiving opening in said first flat plate receives said bolt head and holds said bolt head against rotation.

13. In combination:
a load-bearing vehicle including first and second horizontally spaced-apart and longitudinally extending frame members having rearward and forward ends, and upper and lower ends;
a first hanger bracket operatively secured to said first frame member;
a second hanger bracket operatively secured to said second frame member;
each of said first and second hanger brackets comprising:
(a) a vertically disposed outer side wall having an upper end, a lower end, a forward end, a rearward end, an inner side and an outer side;
(b) a vertically disposed inner side wall which is horizontally spaced from said outer side wall and having an upper end, a lower end, a forward end, a rearward end, an inner side and an outer side;
(c) a first end wall which is secured to said forward ends of said inner and outer side walls and which extends therebetween with said forward end wall having an upper end and a lower end;
(d) a second end wall which is secured to said rearward ends of said inner and outer side walls and which extends therebetween with said second rearward wall having an upper end and a lower end;
(e) a horizontally disposed top wall extending between said upper ends of said inner and outer side walls and which has a first end, a second end, an inner end, an outer end, a top side and a bottom side;
said outer side wall having a horizontally disposed first slot, having first and second ends, formed therein below said upper end of said outer side wall;
said outer side wall having a generally arcuate second slot, with first and second ends, formed therein below said first slot thereof;
said inner side wall having a horizontally disposed first slot, having first and second ends, formed therein below said upper end of said inner side wall which is horizontally aligned with said first slot in said outer side wall thereof;
said inner side wall having a generally arcuate second slot, having first and second ends formed therein below said first slot thereof which is horizontally aligned with said second slot in said outer side wall thereof;
an inverted flat U-shaped first ring member secured to said outer side of said inner side wall so as to partially extend around said first slot in said inner side wall;
said first ring member having inner and outer edges;
said inner edge of said first ring member having a plurality of radially-spaced index notches formed therein;
a flat first actuator plate having an upper end and a lower end;
said first actuator plate having its upper end movably positioned within said inner edge of said first ring member;
said upper end of said first actuator plate having a pointer extending upwardly therefrom which is positioned adjacent said index notches of said first ring member;
said first actuator plate having a bolt opening formed therein at its said upper end;
said first actuator plate having an adjustment opening formed therein at said lower end thereof which is positioned outwardly of said second slot in said inner side wall of said first hanger bracket;
a flat first plate positioned outwardly of said upper end of said first actuator plate which is secured to said first ring member and said inner side wall of the hanger bracket;
said flat first plate having a bolt head receiving opening formed therein configured to receive the head of a bolt;
an inverted flat U-shaped second ring member secured to said outer side of said outer side wall so as to partially extend around said first slot in said outer side wall;
said second ring member having inner and outer edges;
said inner edge of said second ring member having a plurality of radially-spaced index notches formed therein;
a flat second actuator plate having an upper end and a lower end;
said second actuator plate having its upper end movably positioned within said inner edge of said second ring member;

said upper end of said second actuator plate having a pointer extending upwardly therefrom which is positioned adjacent said index notches of said second ring member;

said second actuator plate having a bolt opening formed therein at its said upper end;

said second actuator plate having an adjustment opening formed therein at said lower end thereof;

a flat washer, having a central opening, positioned at the outer side of said second actuator plate;

an elongated bolt having a head portion and a threaded shank portion;

said shank portion of said bolt extending through said bolt head receiving opening in said flat first plate, through said bolt opening in said first actuator plate, through said first ring member, through said first slot in said inner side wall, through said first slot in said outer side wall, through said second ring member and said bolt opening in said second actuator plate, and through said washer;

a nut secured to said bolt outwardly of said washer; and said bolt being configured to have a bushing of a primary axle rotatably mounted thereon between said inner and outer side walls of the hanger bracket.

14. The combination of claim 13 wherein said bolt head receiving opening in said flat plate captures said head portion of said bolt.

* * * * *